United States Patent
Jain et al.

(10) Patent No.: US 12,182,688 B2
(45) Date of Patent: Dec. 31, 2024

(54) HIERARCHICAL PARTITIONING OF OPERATORS

(71) Applicant: Amazon Technologies, Inc., Seattle, WA (US)

(72) Inventors: Animesh Jain, Sunnyvale, CA (US); Yizhi Liu, Fremont, CA (US); Hongbin Zheng, San Jose, CA (US); Jeffrey T. Huynh, San Jose, CA (US); Haichen Li, Campbell, CA (US); Drazen Borkovic, Los Altos, CA (US); Jindrich Zejda, Saratoga, CA (US); Richard John Heaton, San Jose, CA (US); Randy Renfu Huang, Morgan Hill, CA (US); Zhi Chen, Santa Clara, CA (US); Yida Wang, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1168 days.

(21) Appl. No.: 16/698,236

(22) Filed: Nov. 27, 2019

(65) Prior Publication Data
US 2021/0158131 A1  May 27, 2021

(51) Int. Cl.
*G06N 3/063* (2023.01)
*G06N 3/04* (2023.01)

(52) U.S. Cl.
CPC .............. *G06N 3/063* (2013.01); *G06N 3/04* (2013.01)

(58) Field of Classification Search
CPC .......... G06N 3/063; G06N 3/04; G06N 3/044; G06N 3/045; G06N 3/105; G06F 8/4441
See application file for complete search history.

(56) References Cited

U.S. PATENT DOCUMENTS 5,884,083 A * 3/1999 Royce ...................... G06F 8/48
717/118
8,225,074 B2  7/2012 Chakradhar et al.
(Continued)

OTHER PUBLICATIONS

Luk, Wayne, et al. "Parametrised neural network design and compilation into hardware." VLSI for Neural Networks and Artificial Intelligence. Springer, Boston, MA, 1994. 197-206. (Year: 1994).*
(Continued)

*Primary Examiner* — Miranda M Huang
*Assistant Examiner* — Sidney Vincent Bostwick
(74) *Attorney, Agent, or Firm* — Kilpatrick Townsend & Stockton LLP

(57) ABSTRACT

Methods and apparatuses for hierarchical partitioning of operators of a neural network for execution on an acceleration engine are provided. Neural networks are built in machine learning frameworks using neural network operators. The neural network operators are compiled into executable code for the acceleration engine. Development of new framework-level operators can exceed the capability to map the newly developed framework-level operators onto the acceleration engine. To enable neural networks to be executed on an acceleration engine, hierarchical partitioning can be used to partition the operators of the neural network. The hierarchical partitioning can identify operators that are supported by a compiler for execution on the acceleration engine, operators to be compiled for execution on a host processor, and operators to be executed on the machine learning framework.

17 Claims, 6 Drawing Sheets

(56) References Cited

U.S. PATENT DOCUMENTS

| | | | |
|---|---|---|---|
| 2019/0286973 A1 | 9/2019 | Kovvuri et al. | |
| 2019/0340499 A1 | 11/2019 | Burger et al. | |
| 2020/0210821 A1* | 7/2020 | Guo | G06N 3/105 |
| 2020/0218969 A1* | 7/2020 | Englert | G06F 9/4881 |
| 2020/0349161 A1* | 11/2020 | Siddiqui | G06N 20/10 |
| 2022/0343165 A1* | 10/2022 | Hu | G06F 9/4806 |

OTHER PUBLICATIONS

Rotem, Nadav, et al. "Glow: Graph lowering compiler techniques for neural networks." arXiv preprint arXiv:1805.00907 (2018). (Year: 2018).*

Liu, Changxi, et al. "swTVM: exploring the automated compilation for deep learning on sunway architecture." arXiv preprint arXiv: 1904.07404 (2019). (Year: 2019).*

Xing, Yu, et al. "DNNVM: End-to-End Compiler Leveraging Heterogeneous Optimizations on FPGA-based CNN Accelerators." arXiv preprint arXiv:1902.07463 (2019). (Year: 2019).*

Application No. PCT/US2020/059832, International Search Report and Written Opinion, Mailed On Mar. 12, 2021, 12 pages.

\* cited by examiner

HIERARCHICAL PARTITIONING OF OPERATORS

BACKGROUND

Neural networks are built in machine learning frameworks such as Tensorflow, PyTorch, MXNet, etc., by composing operators (e.g., convolutional neural networks (CNN), non-maximum suppression, ragged softmax, top-k, etc.). Many thousands of framework-level operators are available, and development of new framework-level operators can exceed the capability to map the newly developed framework-level operators onto deep-learning accelerators. Neural networks built using newly developed framework-level operators may be prevented from executing on the deep-learning accelerators.

BRIEF DESCRIPTION OF THE DRAWINGS

Various embodiments in accordance with the present disclosure will be described with reference to the drawings, in which.

DETAILED DESCRIPTION

Figure 1:
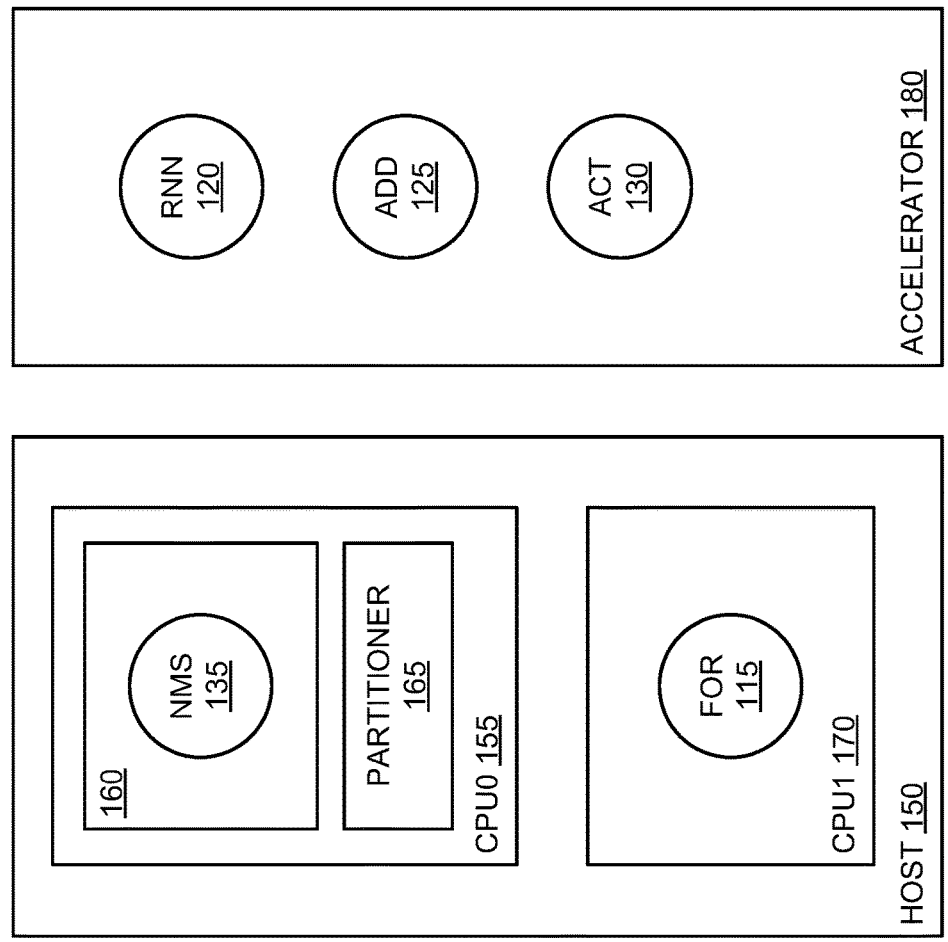
FIG. 1 is a diagram illustrating an example of hierarchical partitioning of neural network operators according to some aspects of the present disclosure.
Figure 1:
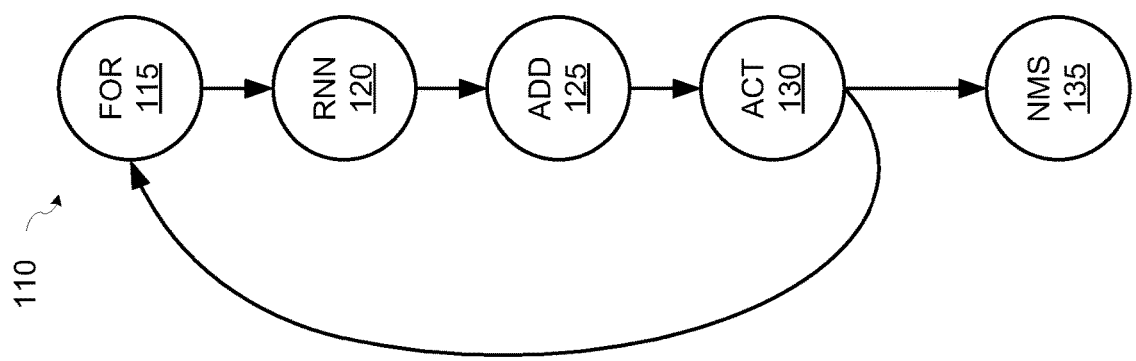

Machine learning frameworks such as TensorFlow or PyTorch include a large number of operators that may be executed on accelerator. An accelerator, also referred to as an acceleration engine, is an integrated circuit designed to efficiently perform processing operations of a neural network. In order for processing operations to be performed by the accelerator, neural network operators are compiled into executable code for the accelerator. Neural network operators may be referred to herein as simply "operators." A neural network sequentially executes different operators. An operator can be, for example, convolution, where computations are performed over an input image. Another operator can be a matrix multiply (e.g., MatMul). There are many types of operators such as nonmax suppression, and ragged softmax.

Many operators are common between different machine learning frameworks, but each machine learning framework may also support some different operators. New operators are created because, for example, developers of neural networks identify new operations and create macros that perform the new operations because the macros can efficiently execute the operations.

Operators are individually added to the compiler for the accelerator. The increase in the number of new operators in the machine learning frameworks may outpace the ability to support them in the accelerator compiler. As a result, neural networks that include an operator not supported by the accelerator compiler can cause the accelerator compiler to fail to compile the neural network properly.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Accelerating neural networks on deep-learning accelerators may be implemented by separating out operators that can be efficient to run on deep-learning accelerators. Deep-learning accelerators may be referred to herein as simply "accelerators" or "acceleration engines." In some cases, hierarchical partitioning of the operators may be implemented. Systems, methods, and apparatuses according to the present disclosure may provide partitioning methods that are multi-level, parameters-aware, capable to handle failures, or any combination of these features.

Multi-level partitioning can enable an operator to be executed within the machine learning framework on a host processor, or executed natively on the host processor, or executed on the accelerator. In addition, multi-level partitioning can enable other machine learning inference or training services to be built on top.

Parameter-awareness of the partitioning methods can enable execution of given instances of an operator on an accelerator. An operator may have many different parameters. For example, a max pool operator can accept different input tensor shapes and data types, strides, kernel sizes, padding, data formats, etc. In some cases, not all combinations of the parameters of an operator can be efficiently mapped onto a deep-learning accelerator. Therefore, parameter-awareness capability of the partitioning method enables determining whether a given instance of an operator having a specific set of parameters can be executed on the accelerator.

A partitioning method might be unsuccessful due to downstream failures, for example, due to an unsupported combination of operator parameters. It is impractical to test all combinations of parameters and operators. The failure handling capability of the partitioning methods can provide a method to handle downstream failures.

Neural networks may be developed on a machine-learning framework. Various operators or portions of operators for the neural network may be executed on a host processor running the machine-learning framework, natively on the host processor, or on an accelerator. The compiler can compile operators for different kinds of target devices. In some cases, the compiler can compile operators for the accelerator as well as for one or more processors of a host computer system. For example, a section of an operator's vectors may be supported by the compiler, but the accelerator hardware can support only a subset of the vectors. In such cases, the remaining vectors for the operator can be compiled to run on the host processor.

In accordance with some aspects of the present disclosure, a method for hierarchical partitioning of neural network operators is provided. FIG. 1 is a diagram illustrating an example of hierarchical partitioning of neural network operators according to some aspects of the present disclosure. Referring to FIG. 1, an example of a flowgraph 110 illustrates a series of neural network operators including: a FOR loop operator 115, a recurrent neural network operator (RNN) 120, an addition operator (ADD) 125, an activation operator (ACT) 130, and a nonmax suppression operator (NMS) 135.

Initial partitioning of the neural network operators may be performed by a partitioner 165 running on a host processor, for example, CPU0 155, on a host computer system 150. The initial partitioning may determine which operators to execute locally (e.g., by the machine learning framework) and the partitioner may make the determination independent of the compiler. The partitioner 165 may be software executing on CPU0 155. In some implementations, the partitioner may be circuitry internal or external to the processor and configured to perform the partitioning operations on the neural network operators. The initial partitioning performed by the partitioner 165 may cause neural network operators that are supported by the compiler to be passed to the compiler and neural network operators that are not supported by the compiler to be passed to the machine learning framework 160 executing on a host processor, for example, CPU0 155. Within the compiler, additional partitioning may be performed based on whether a given neural network operators should be executed by a processing engine, for example the accelerator 180, or whether a given neural network operator should be executed by a processor, for example, host processor CPU0 170. This secondary partitioning separates the operators that can run efficiently or at all on the accelerator.

Referring to FIG. 1, the partitioner 165 may determine that the NMS operator 135 is a neural network operator that is not supported by the compiler. The partitioner 165 may determine to execute the NMS operator on the machine learning framework 160, but the remaining neural network operators (FOR 115, RNN 120, ADD 125, ACT 130) may be sent to the compiler.

The compiler may determine that the FOR operator 115 is supported on a processor, for example, processor CPU1 170, but not on the accelerator 180. The compiler may compile the FOR operator 115 for execution on a host processor, for example, CPU1 170. The compiler may compile the remaining neural network operators (RNN 120, ADD 125, ACT 130) for execution on the accelerator 180. Thus, two levels of partitioning may be implemented: one level that is integrated into the machine learning framework itself and is framework specific; and another level of partitioning to identify the neural network operators that are not suitable for the accelerator.

While the above example is explained using two host processors, fewer or more than two host processors may be used without departing from the scope of the present disclosure. Further, while the above example uses an accelerator as an example of a processing engine, other processing engines, for example, but not limited to, an activation engine, a pooling engine, etc., may be used without departing from the scope of the present disclosure.

In some implementations, the compiler may inform the partitioner of the neural network operators capable of being compiled by providing a list of supported neural network operators (e.g., a "white list") to the partitioner. The white list may contain operators such as, for example, but not limited to, add, convolution, RNN, MatMul, sigmoid, MaxPool, as well as other operators that may be supported by compilers for various machine learning frameworks. The white list is independent of the network being compiled. The partitioner may receive the white list of operators from the compiler and, based on the white list, perform the first level partitioning. As used herein, partitioning an operator or operators may refer to assigning that operator or operators from the set of operators of a neural network for compilation or execution on one of the machine learning framework, the host processor, or the acceleration engine. Neural network operators that are not included in the white list cannot be compiled by the compiler and may be directly executed by the machine learning framework operating on a host processor.

In some implementations, interactive feedback from the compiler to the partitioner may be provided. The partitioner may query the compiler to determine whether the compiler can support a specific instance of an operator. For example, the partitioner may query the compiler regarding a given operator name and specified parameters for the operator. The compiler may then provide feedback to the partitioner indicating whether or not the compiler can support the specific instance of the given operator. The partitioner may then determine whether to partition the given operator instance by assigning the operator instance to the compiler or to execute the given operator instance on the machine learning framework.

The remaining neural network operators that are determined to be supported by the compiler may be sent to the compiler. Within the compiler, the second level partitioning may be performed to identify the neural network operators that are not suitable for the accelerator (or other processing engine). The compiler may partition operators that are not suitable for execution on the acceleration engine to be compiled for execution on the processor. The compiler may generate a compiled model having a processor execution model for neural network operators that cannot be executed on the accelerator and an inferential accelerator model for the neural network operators capable of being executed on the acceleration engine.

Each neural network operator may have an associated set of parameters for executing its operations. For example, a convolution operator may have "strides" and "padding" parameters. Different instances of the same neural network operator may use different parameters in the associated set of parameters. In some cases, even though included on the white list of operators provided by the compiler, different instances of neural network operators using a specific set of associated parameters may not be supported by a processing engine (e.g., the acceleration engine) and may be partitioned for execution on a host processor.

When the compiler receives a neural network with specific operators, each instance of the operator specifies the associated parameters to be used. Based on the specified parameters used by the specific instance of the operator, the compiler can determine whether the specific instance of the operator can be supported by the accelerator. For example, an input feature map may be too large for the accelerator to fit. When the compiler decides that a specific instance of the operator is not supported because of its parameters, the compiler may partition the instance of the operator for execution on the processor (e.g., CPU1 170).

Since the accelerator may not support all combinations of parameters of an operator, the partitioning may be parameter-aware, meaning that the compiler takes into account instances of an operator using different ones of the associated parameters. The compiler may implement programmatic aspects of the white list to evaluate the parameters of the operators. The compiler may inspect all of the parameters of an operator instance to determine whether the accelerator (or other processing engine) can support the instance of the operator with the specific parameters. Depending whether the parameters are supported on the accelerator, the compiler can determine whether the operator will execute on a processor, for example, a host processor, or will execute on the accelerator. When the compiler determines that the operator will not execute on the accelerator, the compiler can compile the operator for execution on the processor.

The white list of operators can be expressed up front by the compiler for identifying the supported operator names. For parameters, because there are many, they are not published up front in the white list. The parameters are handled programmatically for each specific neural network. The compiler may evaluate whether an operator with a given combination of parameters is suitable for execution by the accelerator. If the operator cannot be supported, or cannot be supported efficiently, it may be executed by the processor instead of the accelerator.

The compiler may implement a programmatic white list with code that processes each operator and its parameters in sequential steps. If the compiler identifies a combination of parameters for the operator that cannot be supported by the accelerator, the compiler may repartition the operator by assigning the operator to execute on the processor, for example, the processor that manages the accelerator.

The parameter partitioning may be implemented through a callback mechanism where the operator is parsed to extract the name and various parameters that are passed to a serializer to generate accelerator code. When a particular combination of parameters for an operator cannot be supported, or a particular combination of operators cannot be supported, the callback mechanism may return a value indicating that the combination of parameters or the combination of operators cannot be supported. In some cases, different instances of the same operator or different combinations of particular operators may be supported.

The partitioning by the compiler can also involve efficiency. Operators may be performance profiled for execution on both the processor and the accelerator to determine the more efficient platform for operator execution. For example, the FOR operator functionally may be run on the accelerator but may be slow and can run faster (e.g., more efficiently) on the processor. The compiler may take this efficiency into account and partition the FOR operator to run on the processor. In some cases, partitioning decisions may relate to execution efficiency or compiler efficiency. For example, certain sequences of operators or operators having particular combinations of parameters may compile faster on the processor compiler than on the accelerator compiler.

Thus, compiler failures for neural networks having unknown operators or operators unsupported for execution on the accelerator may be reduced by partitioning known neural network operators for execution on the accelerator while neural network operators not supported for execution on the accelerator can be executed on a host processor.

Aspects of the present disclosure may provide for handling of compiling failures. In some cases, operators may be partitioned for execution on the acceleration engine. During the compilation process for the acceleration engine, if an error occurs, the operator being compiled for the acceleration engine may be repartitioned for execution on the machine learning framework. The compilation process for the acceleration engine may fail due to a bug in the compiler code that prevents compiling a particular operator, or a specific sequence of operators being compiled may cause a failure. For example, a convolution operator followed by a pooling operator may result in a kernel size mismatch that can cause a compiler failure. When a failure occurs, the compiler may generate an error message or code. The compiler may repartition the affected operators to be compiled for execution on the machine learning framework.

Figure 2:
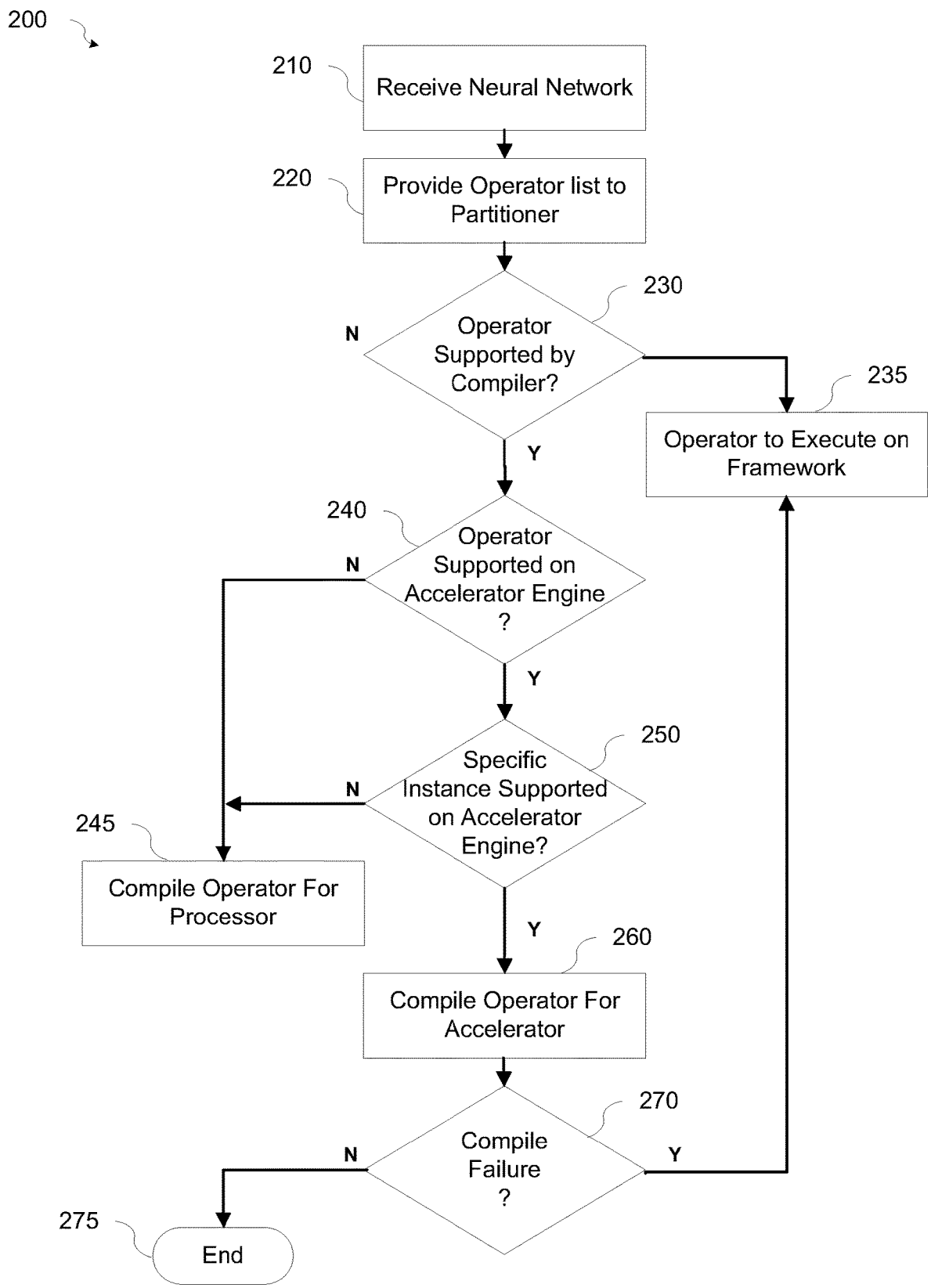
FIG. 2 is a flowchart illustrating an example of a partitioning method according to some aspects of the present disclosure.

FIG. 2 is a flowchart illustrating an example of a partitioning method 200 according to some aspects of the present disclosure. Referring to FIG. 2, at block 210, a neural network generated by a machine learning framework may be received. The neural network may be received by a partitioner configured to determine whether operators of the neural network are supported by a compiler or whether the operators should be executed on the machine learning framework.

At block 220, a list of supported operators may be received from the compiler. The compiler may inform the partitioner of the neural network operators capable of being compiled by providing a list of supported neural network operators (e.g., a "white list") to the partitioner. The white list may contain operators such as, for example, but not limited to, add, convolution, RNN, MatMul, sigmoid, Max-Pool, as well as other operators that may be supported by compilers for various machine learning frameworks. The white list is independent of the network being compiled.

At block 230, it may be determined whether an operator from the neural network is supported by the compiler. The partitioner may compare the neural network operators to the white list to determine whether each operator of the neural network is supported by the compiler or whether the operator should be executed on the machine learning framework.

In response to determining that the operator is not supported by the compiler (230-N), at block 235, the operator may be partitioned by assigning the operator to execute on the machine learning framework. The partitioner may determine that the neural network operator is not the white list and partition the operator by assigning the operator for execution on the machine learning framework.

In response to determining that the operator is supported by the compiler (230-Y), at block 240, it may be determined whether execution of the operator is supported on the acceleration engine. Within the compiler, the partitioning may be performed to identify the neural network operators that are not suitable for the acceleration engine. The compiler may partition operators that are not suitable for execution on the acceleration engine to be compiled for execution natively on the processor.

In response to determining that the operator is not supported by the acceleration engine (240-N), at block 245, the operator may be partitioned to be compiled for native execution on the processor. For example, the compiler may partition operators that are not suitable for execution on the acceleration engine, and separate those operators out for native execution on the processor.

In response to determining that execution of the operator is supported on the acceleration engine (240-Y), at block 250, it may be determined whether execution of the specific instance of the operator is supported on the acceleration engine. Each neural network operator may have an associated set of parameters for executing its operations. Different instances of the same neural network operator may use different parameters in the associated set of parameters. In some cases, even though included on the white list of operators provided by the compiler, different instances of neural network operators using a specific set of associated parameters may not be supported by the acceleration engine.

The compiler may implement programmatic aspects of the white list to evaluate the parameters of the of operators. The compiler may inspect all of the parameters of an operator instance to determine whether the accelerator (or other processing engine) can support the instance of the operator with the specific parameters. Depending whether the parameters are supported on the acceleration engine, the compiler can determine whether the operator will execute on the acceleration engine.

The parameter partitioning may be implemented through a callback mechanism where the operator is parsed to extract the name and various parameters that are passed to a serializer to generate accelerator code. When a particular combination of parameters for an operator cannot be supported, or a particular combination of operators cannot be supported, the callback mechanism may return a value indicating that the combination of parameters or the combination of operators cannot be supported. In some cases, different instances of the same operator or different combinations of particular operators may be supported.

In response to determining that the specific instance of the operator is not supported on the acceleration engine (250-N), at block 245, the operator may be partitioned to be compiled for execution on the processor. In response to determining that execution of the specific instance of the operator is supported on the acceleration engine (250-Y), at block 260, the operator may be compiled for execution on the acceleration engine.

At block 270, it may be determined whether a failure occurs during compilation of the operator for execution on the acceleration engine. For example, the compilation process for the acceleration engine may fail due to a bug in the compiler code that prevents compiling a particular operator, or a specific sequence of operators being compiled may cause a failure. The compiler may generate an error message or code indicating the failure.

In response to determining that a failure did not occur (270-N), at block 275, the partitioning process ends. In response to determining that a failure did occur during compilation of the operator for execution on the acceleration engine (270-Y), at block 245, the compiler may repartition the operator by assigning the operator for execution on the machine learning framework.

Figure 3:
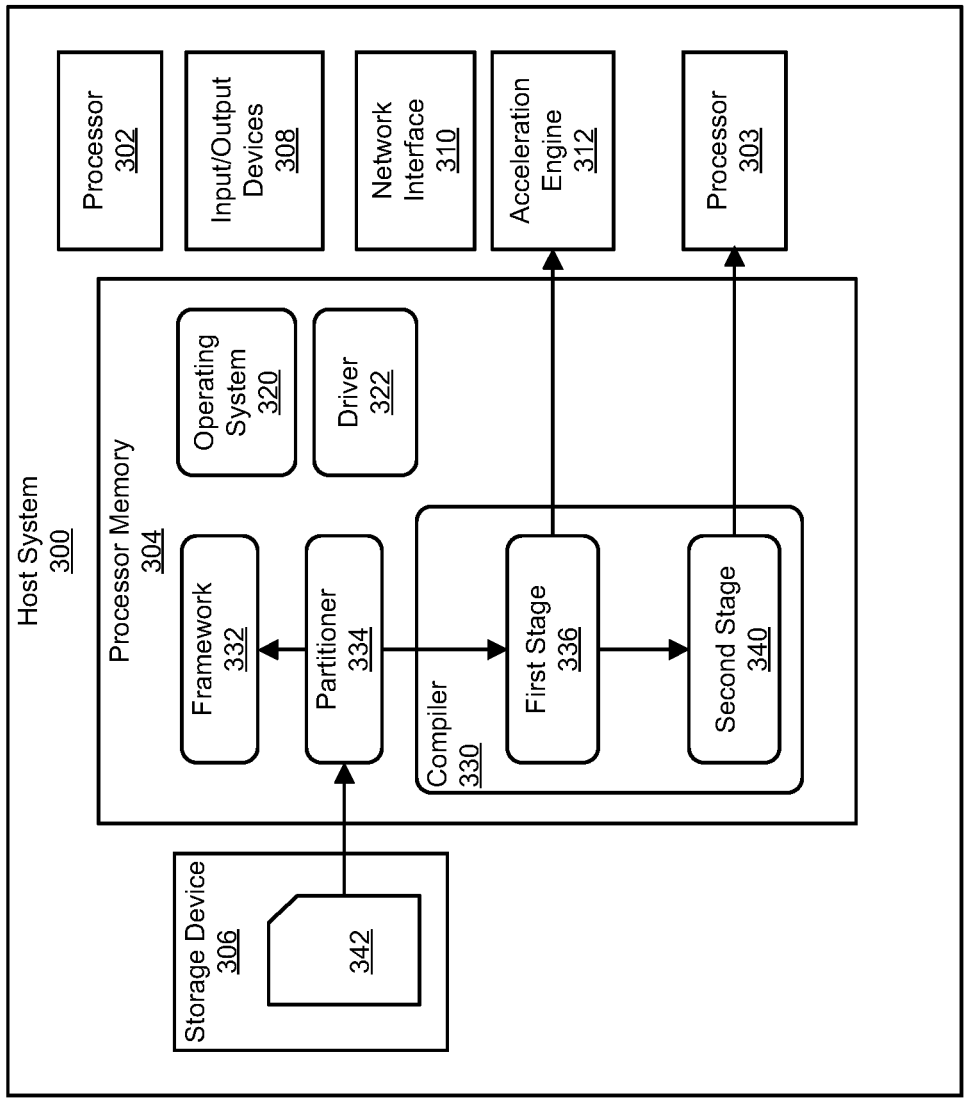
FIG. 3 includes a block diagram illustrating an example of a host system on which a compiler and a partitioner according to some aspects of the present disclosure can execute.

FIG. 3 includes a block diagram illustrating an example of a host system 300 on which a compiler 330 and a partitioner 334, such as is described herein, can execute. The illustrated host system 300 is an example of a computing device, and includes a set of processors 302, 303, a processor memory 304, at least one storage device 306, various Input/Output (I/O) devices 308, and at least one network interface 310. In the example of FIG. 3, the host system 300 also includes an acceleration engine 312, which is an integrated circuit device that can accelerate certain operations or computations performed by the host system 300. In various examples, the host system 300 can be implemented as a server in a data center, a desktop computer, a laptop computer, a tablet computer, or a smartphone, among other examples. In some examples, operations or components discussed below as performed or included in the host system 300 can be performed or included in other computer devices. For example, the compiler 330 and partitioner 343 can execute on the host system 300 while the acceleration engine 312 is located at a different host system.

The processors 302, 303 are integrated circuit devices that can execute program code, in the form of instructions. In some implementations, the processors 302, 303 may be processing cores on the same integrated circuit), each processing core configured for independently executing the various software applications or tools. The program code can be for various software applications or tools, such as an operating system 320, a machine learning framework 332, or the compiler 330. While the processors 302, 303 are executing programs, the instructions for the programs can be stored in the processor memory 304. The instructions can also be stored elsewhere, such as on the storage device 306, and can be loaded into the processor memory 304 when needed by the processors 302, 303. The processors 302, 303 can also use the processor memory 304 for temporary storage of other data on which the processors 302, 303 are operating. In various examples, the processor memory 304 is a volatile memory type, such as a type of Random Access Memory, though non-volatile memory types can, alternatively or additionally, be used for the processor memory 304.

The storage device 306 is an example of a device that can include non-volatile memory. For example, the storage device 306 can be a magnetic disk drive, a solid state drive, or an optical drive, among other examples. The storage device 306 can further be non-transitory, such that program code and other data stored on the storage device 306 remains present when the storage device 306 is not powered on.

The storage device 306 is one example of a peripheral device, which are components that can be coupled to the host system 300 to add functionality to the host system 300. Other examples of peripheral devices include the Input/Output devices 308 and the network interface 310. The Input/Output devices 308 can include user input and output devices, such as keyboards, mice, touch screens, microphones, display screens, speakers, printers, and scanners, among other examples. The network interface 310, which can be implemented using a network interface card, can provide access to one or more networks. The network interface 310 can include, for example, a physical port for connecting a network cable and/or wireless antennas for communicating with Wi-Fi and/or cellular networks. The network interface 310 can also be described as an I/O device.

The acceleration engine 312 is also another type of peripheral device or I/O device. The acceleration engine 312 is a device that is purpose built to perform certain operations that can be performed by the processors 302, 303 but can be performed faster or more efficiently by the acceleration engine 312. For example, the acceleration engine 312 can be a neural network accelerator, and, as such, may be able to perform the large scale, parallel computations of a neural network more efficiently than when the computations are performed by the processors 302, 303. As another example, the acceleration engine 312 can be a graphics processing unit (GPU), and may be optimized to perform the computations needed for graphics rendering. Other examples of devices that can be implemented by the acceleration engine 312 include cryptographic accelerators, compression and decompression accelerators, 3-D accelerators, regular expression accelerators, security accelerators, and others.

In various examples, the acceleration engine 312 can execute program code to perform certain operations. For example, when the acceleration engine 312 is a neural network accelerator, the acceleration engine 312 can be programmed to execute a particular neural network, such as one that performs image recognition or one that performs machine translation. As a further example, to support the execution of a neural network, the acceleration engine 312 can be programed to perform operations such as copying data for the neural network from processor memory 304 (for example) into the acceleration engine 312, copying input data for the neural network from processor memory 304 into the acceleration engine 312, and/or copying results from the acceleration engine 312 into the processor memory 304, among other examples.

To generate program code for the acceleration engine 312, in various examples, the host system 300 can execute the compiler 330. Compilers, in general, are software programs that translate program code written in a human-readable language into a format (e.g., machine instructions) that can be read and processed by an integrated circuit device. In the example of FIG. 3, the acceleration engine 312 is a neural network accelerator and the compiler 330 may compile portions of a neural network description into instructions to be executed by the acceleration engine 312 and the processor 303. When the acceleration engine 312 implements a different type of accelerator, another compiler can be used.

The partitioner 334 of the machine learning framework 332 may perform a first level of partitioning of the neural network operators from the input code 342 to identify neural network operators to be executed by the machine learning framework 332 and neural network operators to be sent to the compiler. The output of the partitioner 334 may be neural network operators included on a white list of neural network operators received from the compiler 330. The compiler 330 can be activated, for example, when the partitioner 334 identifies neural network operators from the input code 342 that are supported by the compiler 330. Once the compiler 330 is activated, the processor, for example, the processor 303, can load the instructions for the compiler 330 into the processor memory 304, and can execute the instructions.

Within the compiler 330, a second level partitioning may be performed to identify the neural network operators that are not suitable for the acceleration engine 312. The compiler 330 may generate a compiled model having a processor execution model for neural network operators that cannot be executed on the acceleration engine 312 and an inferential accelerator model for the neural network operators capable of being executed on the acceleration engine 312.

In the example of FIG. 3, the compiler 330 includes a first stage 336 and a second stage 340, which each perform different operations to produce compiled code. In other examples, the compiler 330 can combine the operations of the first stage 336 and the second stage 340 into fewer stages, or can divide the operations of one of the stages into multiple stages.

The first stage 336 can perform intermediate processing on white list neural network operators that are output from the partitioner 334. For example, the first stage 336 may determine operations that can be performed by the acceleration engine 312 and operations that can be performed natively by the processor 303. Processing by the first stage 336 can include other steps, such as scheduling, or determining the order in which the acceleration engine 312 and/or processor 302 will perform operations, among other examples.

The first stage 336 may evaluate the operators received from the partitioner 334 to determine whether the operators are supported for execution on the acceleration engine 312 and may further partition the operators for execution on a processor, for example, the processor 303. When the compiler 330 receives a neural network with specific operators, each instance of the operator specifies the associated parameters to be used. Based on the specified parameters used by the specific instance of the operator, first stage 336 of the compiler 330 can determine whether the specific instance of the operator can be supported by the acceleration engine 312. When the first stage 336 of the compiler 330 determines that an operator cannot be supported by the acceleration engine 312, the first stage 336 may partition the operator by assigning the operator to be compiled by the second stage 340 for execution on the processor, for example the processor 303.

The first stage 336 may generate a compiled model that includes the various operations of the supported operators to be performed by the components of the acceleration engine 312, in the order that the operations are to be performed. The output can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The second stage 340 can compile the operators partitioned to the second stage 340 by the first stage 336, and perform various operations for producing the instructions that are to be executed by the processor 303. These operations can include, for example, removing redundant dependencies, resolving or handling dependencies between nodes by inserting synchronization instructions into the code, identifying possibly optimizations in memory usage or memory bandwidth usage, and other operations.

The second stage 340 may generate a compiled model that includes the various operations of the supported operators to be performed by the components of the processor 303, in the order that the operations are to be performed. The output can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

In the example of FIG. 3, the host system 300 can be executing a driver 322, which can also be referred to as a device driver or runtime driver, that manages the acceleration engine 312. The driver 322 can provide an interface between applications executing on the host system 300 (or on another host system) and the acceleration engine 312. For example, the driver 322 can provide an Application Program Interface (API) that defines functions for feeding input data to the acceleration engine 312 and defining the operation to perform on the input data.

In this and other examples, the driver 322 can configure the acceleration engine 312 to perform the operation. For example, the driver 322 can identify a neural network that the acceleration engine 312 is to execute, as well as the location in the processor memory 304 or on the storage device 306 where the compiled code for the neural network is located. The driver 322 can further load into the acceleration engine 312 or cause the acceleration engine 312 to load the compiled code, can load or cause the acceleration engine 312 to load the input data on which the neural network is to operate, and/or can cause the acceleration engine 312 to being executing on the input data. Once the acceleration engine 312 has finished, the acceleration engine 312 can notify the driver 322, and the driver 322 can deliver a result back to the application that requested the result.

Figure 4:
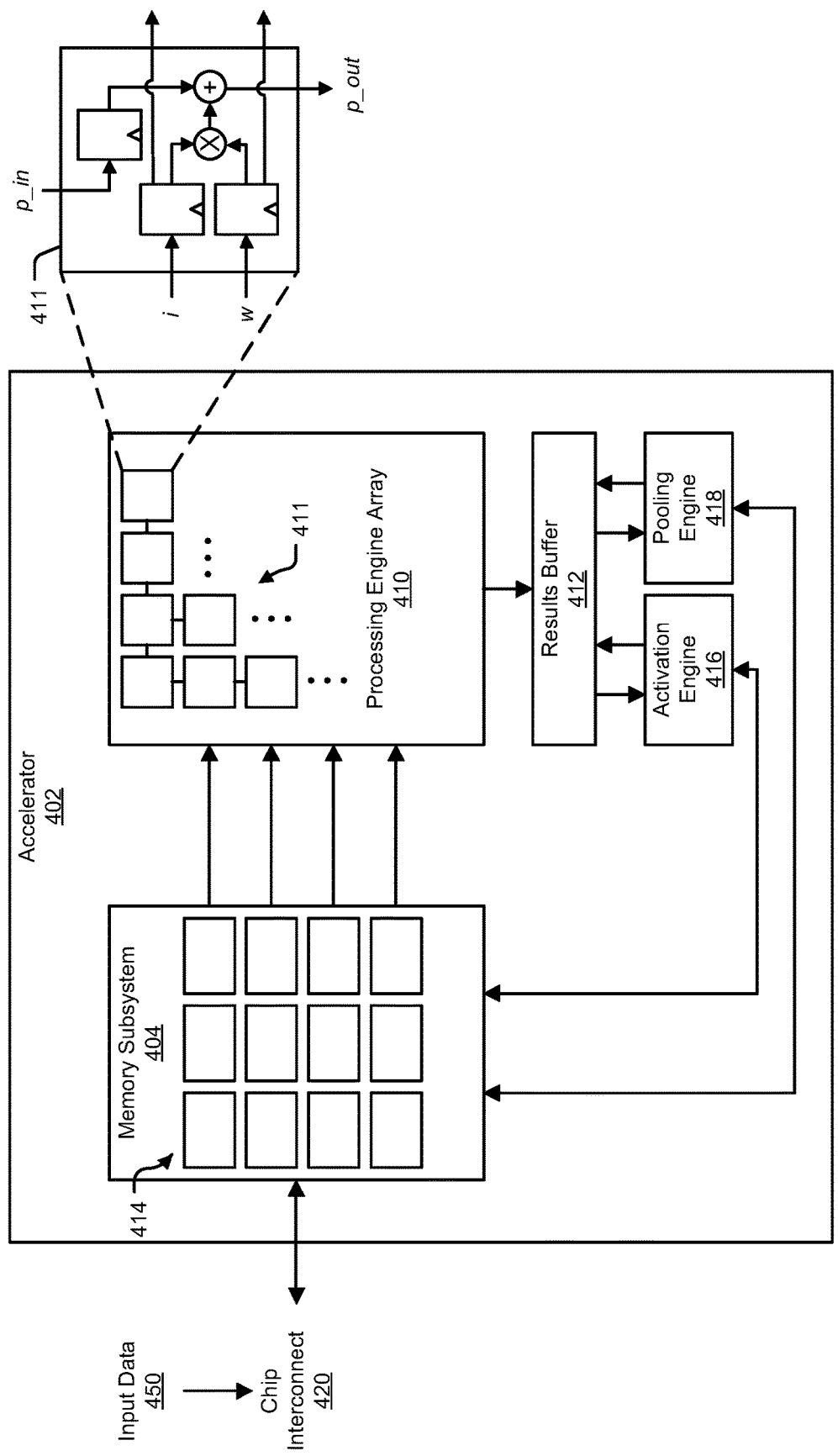
FIG. 4 is a block diagram illustrating an example of an integrated circuit device according to some aspects of the present disclosure.

FIG. 4 is a block diagram illustrating an example of an integrated circuit device that can implement hierarchical partitioning of neural network operators. The example of FIG. 4 illustrates an accelerator 402. In various examples, the accelerator 402, for a set of input data (e.g., input data 450), can execute computations using a processing engine array 410, an activation engine 416, and/or a pooling engine 418. In some examples, the example accelerator 402 may be an integrated circuit component of a processor, such as a neural network processor. The processor may have other integrated circuit components, including additional accelerator engines.

In various implementations, the memory subsystem 404 can include multiple memory banks 414. In these implementations, each memory bank 414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 404 can permit simultaneous access to the read or write channels of multiple memory banks. As another example, the memory subsystem 404 can include arbitration logic such that arbitration between, for example, the outputs of multiple memory banks 414 can result in more than one memory bank's output being used. In these and other examples, though globally managed by the memory subsystem 404, each memory bank can be operated independently of any other.

Having the memory banks 414 be independently accessible can increase the efficiency of the accelerator 402. For example, values can be simultaneously read and provided to each row of the processing engine array 410, so that the entire processing engine array 410 can be in use in one clock cycle. As another example, the memory banks 414 can be read at the same time that results computed by the processing engine array 410 are written to the memory subsystem 404. In contrast, a single memory may be able to service only one read or write at a time. With a single memory, multiple clock cycles can be required, for example, to read input data for each row of the processing engine array 410 before the processing engine array 410 can be started.

In various implementations, the memory subsystem 404 can be configured to simultaneously service multiple clients, including the processing engine array 410, the activation engine 416, the pooling engine 418, and any external clients that access the memory subsystem 404 over a communication fabric 420. In some implementations, being able to service multiple clients can mean that the memory subsystem 404 has at least as many memory banks as there are clients. In some cases, each row of the processing engine array 410 can count as a separate client. In some cases, each column of the processing engine array 410 can output a result, such that each column can count as a separate write client. In some cases, output from the processing engine array 410 can be written into the memory banks 414 that can then subsequently provide input data for the processing engine array 410. As another example, the activation engine 416 and the pooling engine 418 can include multiple execution channels, each of which can be separate memory clients. The memory banks 414 can be implemented, for example, using static random access memory (SRAM).

In various implementations, the memory subsystem 404 can include control logic. The control logic can, for example, keep track of the address spaces of each of the memory banks 414, identify memory banks 414 to read from or write to, and/or move data between the memory banks 414. In some implementations, memory banks 414 can be hardwired to particular clients. For example, a set of memory banks 414 can be hardwired to provide values to the rows of the processing engine array 410, with one memory bank servicing each row. As another example, a set of memory banks can be hard wired to receive values from columns of the processing engine array 410, with one memory bank receiving data for each column.

The processing engine array 410 is the computation matrix of the example accelerator 402. The processing engine array 410 can, for example, execute parallel integration, convolution, correlation, and/or matrix multiplication, among other things. The processing engine array 410 includes multiple processing engines 411, arranged in rows and columns, such that results output by one processing engine 411 can be input directly into another processing engine 411. Processing engines 411 that are not on the outside edges of the processing engine array 410 thus can receive data to operate on from other processing engines 411, rather than from the memory subsystem 404.

In various examples, the processing engine array 410 uses systolic execution, in which data arrives at each processing engine 411 from different directions at regular intervals. In some examples, input data can flow into the processing engine array 410 from the left and weight values can be loaded at the top. In some examples weights and input data can flow from the left and partial sums can flow from top to bottom. In these and other examples, a multiply-and-accumulate operation moves through the processing engine array 410 as a diagonal wave front, with data moving to the right and down across the array. Control signals can be input at the left at the same time as weights, and can flow across and down along with the computation.

In various implementations, the number of columns in the processing engine array 410 determines the computational capacity of the processing engine array 410, and the number of rows determines the required memory bandwidth for achieving maximum utilization of the processing engine array 410. The processing engine array 410 can have, for example, 64 columns and 428 rows, or some other number of columns and rows.

An example of a processing engine 411 is illustrated in FIG. 4 in an inset diagram. As illustrated by this example, a processing engine 411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 411.

In the illustrated example, an input from above can include a partial sum, p_in, provided either from another processing engine 411 or from a previous round of computation by the processing engine array 410. When starting a computation for a new set of input data, the top row of the processing engine array 410 can receive a fixed value for p_in, such as zero. As illustrated by this example, i and w are multiplied together and the result is summed with p_in to produce a new partial sum, p_out, which can be input into another processing engine 411. Various other implementations of the processing engine 411 are possible.

Outputs from the last row in the processing engine array 410 can be temporarily stored in the results buffer 412. The results can be intermediate results, which can be written to the memory banks 414 to be provided to the processing engine array 410 for additional computation. Alternatively, the results can be final results, which, once written to the memory banks 414 can be read from the memory subsystem 404 over the communication fabric 420, to be output by the system.

In some implementations, the accelerator 402 includes an activation engine 416. In these implementations, the activation engine 416 can combine the results from the processing engine array 410 into one or more output activations. For example, for a convolutional neural network, convolutions from multiple channels can be summed to produce an output activation for a single channel. In other examples, accumulating results from one or more columns in the processing engine array 410 may be needed to produce an output activation for a single node in the neural network. In some examples, activation engine 416 can be bypassed.

In various examples, the activation engine 416 can include multiple separate execution channels. In these examples, the execution channels can correspond to the columns of the processing engine array 410, and can perform an operation on the outputs of a column, the result of which can be stored in the memory subsystem 404. In these examples, the activation engine 416 may be able to perform between 1 and n parallel computations, where n is equal to the number of columns in the processing engine array 410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 402 can include a pooling engine 418. Pooling is the combining of outputs of the columns of the processing engine array 410. Combining can include for example, computing a maximum value, a minimum value, an average value, a median value, a summation, a multiplication, or another logical or mathematical combination. In various examples, the pooling engine 418 can include multiple execution channels that can operating on values from corresponding columns of the processing engine array 410. In these examples, the pooling engine 418 may be able to perform between 1 and n parallel computations, where n is equal to the number of columns in the processing engine array 410. In various examples, execution channels of the pooling engine 418 can operate in parallel and/or simultaneously. In some examples, the pooling engine 418 can be bypassed.

Herein, the activation engine 416 and the pooling engine 418 may be referred to collectively as execution engines. The processing engine array 410 is another example of an execution engine. Another example of an execution engine is a Direct Memory Access (DMA) engine, which may be located outside the accelerator 402.

Input data 450 can arrive over the communication fabric 420. The communication fabric 420 can connect the accelerator 402 to other components of a processor, such as a DMA engine that can obtain input data 450 from an Input/Output (I/O) device, a storage drive, or a network interface. The input data 450 can be, for example one-dimensional data, such as a character string or numerical sequence, or two-dimensional data, such as an array of pixel values for an image or frequency and amplitude values over time for an audio signal. In some examples, the input data 450 can be three-dimensional, as may be the case with, for example, the situational information used by a self-driving car or virtual reality data. In some implementations, the memory subsystem 404 can include a separate buffer for the input data 450. In some implementations, the input data 450 can be stored in the memory banks 414 when the accelerator 402 receives the input data 450.

In some examples, the accelerator 402 can implement a neural network processing engine. In these examples, the accelerator 402, for a set of input data 450, can execute a neural network to perform a task for which the neural network was trained. Executing a neural network on a set of input data can be referred to as inference or performing inference.

The weights for the neural network can be stored in the memory subsystem 404, along with input data 450 on which the neural network will operate. The neural network can also include instructions, which can program the processing engine array 410 to perform various computations on the weights and the input data. The instructions can also be stored in the memory subsystem 404, in the memory banks 414 or in a separate instruction buffer. The processing engine array 410 can output intermediate results, which represent the outputs of individual layers of the neural network. In some cases, the activation engine 416 and/or pooling engine 418 may be enabled for computations called for by certain layers of the neural network. The accelerator 402 can store the intermediate results in the memory subsystem 404 for inputting into the processing engine array 410 to compute results for the next layer of the neural network. The processing engine array 410 can further output final results from a last layer of the neural network. The final results can be stored in the memory subsystem 404 and then be copied out to host processor memory or to another location.

Figure 5:
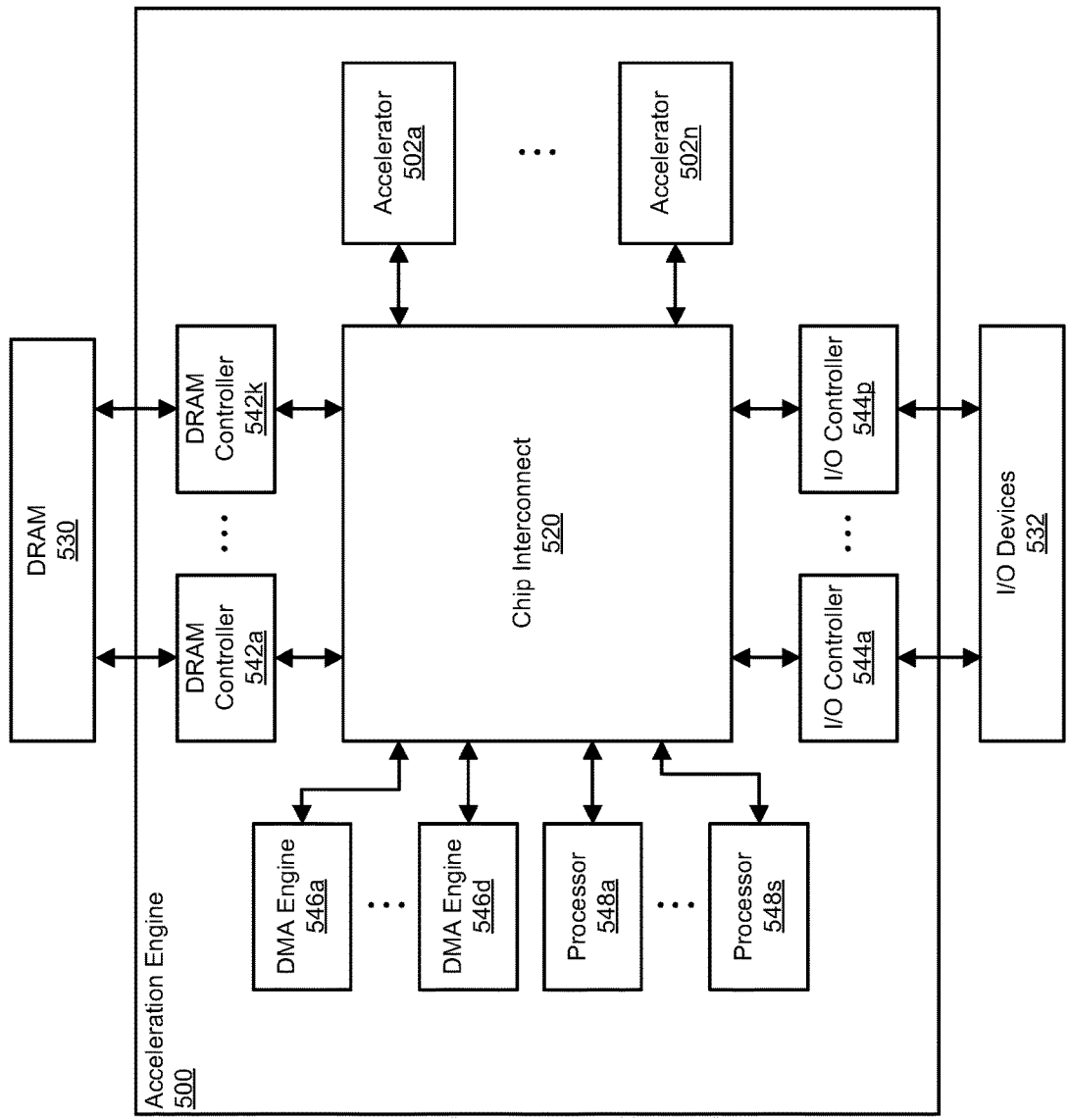
FIG. 5 includes a block diagram that illustrates an example of an acceleration engine according to some aspects of the present disclosure.

FIG. 5 includes a block diagram that illustrates an example of an acceleration engine 500. The acceleration engine 500 is an example of an integrated circuit that can include one or more accelerators 502a-502n that may be similar to the accelerator illustrated in FIG. 4.

In the example of FIG. 5, the acceleration engine 500 includes multiple accelerators 502a-502n, each of which can perform a set of operations. In various examples, the accelerators 502a-502n are for particular types of operations, so that the accelerators 502a-502n can perform the operations much faster than when similar operations are performed by a general purpose processor. In various examples, to perform a set of operations, input data on which the operations are to be performed must first be moved into the accelerators 502a-502n. Additionally, in some cases, program code is also moved into the accelerators 502a-502n, which programs the operations that the accelerators 502a-502n will perform on the data. In the illustrated example, the acceleration engine 500 includes n accelerators 502a-502n. Examples of accelerators that can be included in the acceleration engine 500 include graphics accelerators, floating point accelerators, neural network accelerators, and others. In various examples, the accelerators 502a-502n can each be the same (e.g., each of the is a graphics accelerator) or can be different (e.g., the accelerators 502a-502n include a graphics accelerator, a floating point accelerator, and neural network accelerator).

The example acceleration engine 500 further includes DRAM controllers 542a-542k for communicating with an external memory. The external memory is implemented, in this example, using DRAM 530. In the illustrated example, the acceleration engine 500 includes k DRAM controllers 542a-542k, each of which may be able to communicate with an independent set of banks of DRAM. In other examples, other types of RAM technology can be used for the external memory. The DRAM controllers 542a-542k can also be referred to as memory controllers.

In various examples, input data and/or program code for the accelerators 502a-502n can be stored in the DRAM 530. Different programs can cause the accelerators 502a-502n to perform different operations. For example, when one of the accelerators is a neural network accelerator, one program can configure the neural network accelerator to perform speech recognition while another program can configure the neural network accelerator to perform image recognition. In various examples, different accelerators 502a-502n can be programmed with different programs, so that each performs a different set of operations. In various examples, the processors 548a-548s can manage moving of program code from the DRAM 530 to the accelerators 502a-502n.

The example acceleration engine 500 further includes I/O controllers 544a-544p for communicating with I/O devices 532 in the system. The acceleration engine 500 can communicate with I/O devices over, for example, a processor bus. In some examples, the processor bus can be implemented using Peripheral Component Interconnect (PCI) and/or a variation of the PCI bus protocol. The processor bus can connect the acceleration engine 500 to I/O devices such as, for example, input and output devices, memory controllers, storage devices, and/or network interface cards, among other things. In some examples, the I/O controllers 544-544p can enable the acceleration engine 500 to act as an I/O device for a host processor. For example, the acceleration engine 500 can be the recipient of input data from the host processor, and a command indicating an operation to be performed on the input data (e.g., a particular computation or analysis). In the illustrated example, the acceleration engine 500 includes p I/O controllers 544a-544p, each of which may include a separate root complex and may communicate with a separate set of I/O devices 532. In other examples, other standardized bus protocols, such as Ultra Path Interconnect (UPI) can be used for the host bus. In other examples, a proprietary bus protocol can be used.

Movement of data in the acceleration engine 500 can be managed by one or more processors 548a-548s, which can also be referred to as data management processors. In the example of FIG. 5, the acceleration engine 500 includes s processors 548a-548s incorporated into the device (e.g., on the same silicon die). In other examples, the processors 548a-548s can be external to the acceleration engine 500 (e.g., on a different die and/or in a different package). In some examples, the processors 548a-548s can manage the movement of data from I/O devices 532 to the accelerators 502a-502n or the DRAM 530. For example, input data may be located at an I/O device 532 or in processor memory, and the processors 548a-548s can move the input from the I/O device 532 or processor memory into an accelerator or into DRAM 530. As another example, program code for the accelerators 502a-502n may be located on an I/O device 532 or in processor memory.

The example acceleration engine 500 further includes DMA engines 546a-546d that can move data between the accelerators 502a-502n, DRAM controllers 542a-542k, and I/O controllers 544a-544p. In the illustrated example, the acceleration engine 500 includes d DMA engines 546a-546d. In some implementations, the DMA engines 546a-546d can be assigned to specific tasks, such as moving data from the DRAM controllers 542a-542d to the accelerators 502a-502n, or moving data between the I/O controllers 544a-544p and the accelerators 502a-502n. These tasks can be assigned, for example, by enqueuing descriptors with the DMA engines 546a-546d, where a descriptor identifies an address for a block of data and an operation (e.g., a read or a write) to perform. A descriptor, for example, can direct a DMA engine to instruct a DMA controller to read a block of data from DRAM 530. A descriptor can, as a further example, instruct the DMA engine to write data, read by the DMA controller, to an accelerator. Further descriptors can be used to move data from an accelerator to DRAM 530.

In various examples, each of the processors 548a-548s can be responsible for managing the data movement for a different accelerator. In some examples, a processor may manage the data movement for more than one accelerator. Similarly, in various examples, each of the processors 548a-548s can be assigned to one or more DMA engines 546a-546d. In these and other examples, associations between processors 548a-548s, accelerators 502a-502n, and DMA engines 546a-546d are determined by program code being executed by each respective processor.

In the example acceleration engine 500, the various components can communicate over a chip interconnect 520. The chip interconnect 520 primarily includes wiring for routing data between the components of the acceleration engine 500. In some cases, the chip interconnect 520 can include a minimal amount of logic, such as multiplexors to control the direction of data, flip-flops for handling clock domain crossings, and timing logic.

Figure 6:
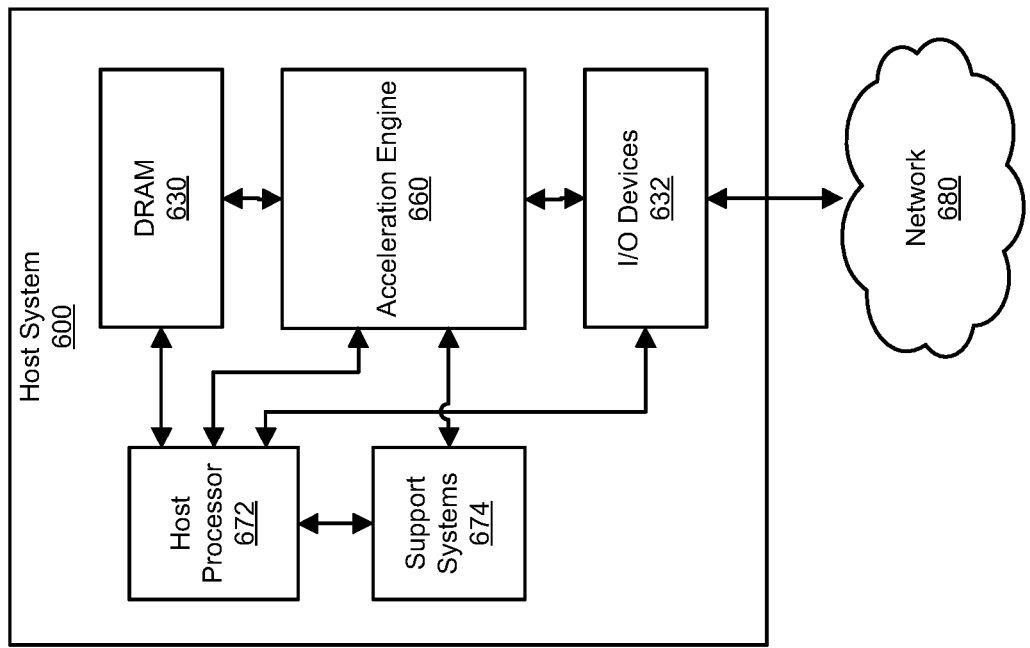
FIG. 6 includes a block diagram that illustrates an example of a host system according to some aspects of the present disclosure.

FIG. 6 includes a block diagram that illustrates an example of a host system 600 in which an acceleration engine 660 can be used. The acceleration engine 660 of FIG. 6 is an example of a device that can include one or more accelerators such as is illustrated in FIG. 5. The example host system 600 of FIG. 6 includes the acceleration engine 660, a host processor 672, DRAM 630 or processor memory, I/O devices 632, and support systems 674. In various implementations, the host system 600 can include other hardware that is not illustrated here.

The host processor 672 is a general purpose integrated circuit that is capable of executing program instructions. In some examples, the host processor 672 can include multiple processing cores. A multi-core processor may include multiple processing units within the same processor. In some examples, the host system 600 can include more than one host processor 672. In some examples, the host processor 672 and the acceleration engine 660 can be one chip, such as, one or more integrated circuits within the same package.

In various examples, the host processor 672 can communicate with other components in the host system 600 over one or more communication channels. For example, the host system 600 can include a host processor bus, which the host processor 672 can use to communicate with the DRAM 630, for example. As another example, the host system 600 can include an I/O bus, such as a PCI-based bus, over which the host processor 672 can communicate with the acceleration engine 660 and/or the I/O devices 632, for example. In various examples, the host system 600 can, alternatively or additionally, include other communication channels or busses, such as serial busses, power management busses, storage device busses, and so on.

In some examples, software programs executing on the host processor 672 can receive or generate input for processing by the acceleration engine 660. In some examples, the programs can select an appropriate neural network to execute for a given input. For example, a program may be for language translation, and can select one or more neural networks capable of speech recognition and/or machine translation. In these and other examples, the programs can configure the acceleration engine 660 with the neural network to execute, and/or can select a neural network processing engine on the acceleration engine 660 that has previously been configured to execute the desired neural network. In some examples, once the acceleration engine 660 has started an inference on input data, the host processor 672 can manage the movement of data (such as weights, instructions, intermediate results, results of conditional layers, and/or final results) into or out of the acceleration engine 660.

In some examples, a software program that is using the acceleration engine 660 to conduct an inference can read the result from a conditional layer from the acceleration engine 660 and/or from a storage location, such as in DRAM 630. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 630 is memory that is used by the host processor 672 for storage of program code that the host processor 672 is in the process of executing, as well as values that are being operated on. In some examples, the data for a neural network (e.g., weight values, instructions, and other data) can be all or partially stored in the DRAM 630. DRAM is a common term for processor memory, and though DRAM is volatile memory, processor memory can be volatile and/or non-volatile. Though not illustrated here, the host system 600 can include other volatile and non-volatile memories for other purposes. For example, the host system 600 can include a Read-Only Memory (ROM) that stores boot code for booting the host system 600 at power on, and/or Basic Input/Output System (BIOS) code.

Though not illustrated here, the DRAM 630 can store instructions for various programs, which can be loaded into and be executed by the host processor 672. For example, the DRAM 630 can be storing instructions for an operating system, one or more data stores, one or more application programs, one or more drivers, and/or services for implementing the features disclosed herein.

The operating system can manage and orchestrate the overall operation of the host system 600, such as scheduling tasks, executing applications, and/or controller peripheral devices, among other operations. In some examples, a host system 600 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 600. For example, some drivers can provide communication between the operating system and peripheral devices or I/O devices 632. Alternatively or additionally, some drivers may provide communication between application programs and the operating system, and/or application programs and peripheral devices accessible to the host system 600. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 632 can include hardware for connecting to user input and output devices, such as keyboards, mice, pens, tablets, voice input devices, touch input devices, displays or monitors, speakers, and printers, among other devices. The I/O devices 632 can also include storage drives and/or network interfaces for connecting to a network 680. For example, the host system 600 can use a network interface to communicate with storage devices, user terminals, other computing devices or servers, and/or other networks, among various examples.

In various examples, one or more of the I/O devices 632 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 600 or may be in an external enclosure. A storage device can be fixed (e.g., attached by screws) or removable (e.g., having a physical release mechanism and possibly a hot-plug mechanism).

Storage devices, the DRAM 630, and any other memory component in the host system 600 are examples of computer-readable storage media. Computer-readable storage media are physical mediums that are capable of storing data in a format that can be read by a device such as the host processor 672. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 632 can be PCI-based devices. In these examples, a PCI-based I/O device includes a PCI interface for communicating with the host system 600. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 674 can include hardware for coordinating the operations of the acceleration engine 660. For example, the support systems 674 can include a microprocessor that coordinates the activities of the acceleration engine 660, including moving data around on the acceleration engine 660. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 672. In some examples, the program executed by the microprocessor is stored on the hardware of microprocessor, or on a non-volatile memory chip in the host system 600. In some examples, the microprocessor and the acceleration engine 660 can be on chip, such as one integrated circuit on the same die and in the same package.

In some examples, the support systems 674 can be responsible for taking instructions from the host processor 672 when programs executing on the host processor 672 request the execution of a neural network. For example, the host processor 672 can provide the support systems 674 with a set of input data and a task that is to be performed on the set of input data. In this example, the support systems 674 can identify a neural network that can perform the task, and can program the acceleration engine 660 to execute the neural network on the set of input data. In some examples, the support systems 674 only needs to select an appropriate neural network processing engine of the neural network processor. In some examples, the support systems 674 may need to load the data for the neural network onto the acceleration engine 660 before the acceleration engine 660 can start executing the neural network. In these and other examples, the support systems 674 can further receive the output of executing the neural network, and provide the output back to the host processor 672.

In some examples, the operations of the support systems 674 can be handled by the host processor 672. In these examples, the support systems 674 may not be needed and can be omitted from the host system 600.

In various examples, the host system 600 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 600 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules. Any of the methods described herein can be implemented as a computer-readable medium or computer program product comprising instructions which, when the program is executed by one or more computers, cause the one or more computers to carry out the steps of the method. Such computer program products can be transmitted, over a wired or wireless network, in a data carrier signal carrying the computer program product.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for hierarchical partitioning of operators of a neural network for compiling on an acceleration engine, the method comprising:
    executing a machine learning framework to generate a set of neural network operators, wherein at least some of the neural network operators are executable on the acceleration engine;
    comparing a list of neural network operators supported by a compiler with the set of neural network operators of the neural network;
    partitioning, by a partitioner based on the comparison, the set of neural network operators of the neural network into a set of first neural network operators that are not supported by the compiler and a set of second neural network operators that are supported by the compiler;
    providing the set of second neural network operators to the compiler;
    partitioning, by the partitioner, the set of second neural network operators into a set of third neural network operators initially determined to be capable of execution on the acceleration engine and a set of fourth neural network operators to be executed by a host processor;
    evaluating parameters of the set of third neural network operators;
    determining that at least some of the neural network operators in the set of third neural network operators initially determined to be capable of execution on the acceleration engine include parameters that are not supported by the acceleration engine;
    partitioning, by the partitioner, the set of third neural network operators into a set of fifth neural network operators to be executed on the host processor, the set of fifth neural network operators comprising specific instances of the neural network operators having the parameters that are not supported by the acceleration engine;

compiling a first model of a first subset of the neural network operators supported by the compiler and having parameters that are supported by the acceleration engine for execution on the acceleration engine; and compiling a second model of a second subset of the operators supported by the compiler for execution on the host processor, the second subset of the operators including the specific instances of the neural network operators having the parameters that are not supported by the acceleration engine.

2. The method of claim 1, further comprising compiling the neural network operators of the third set of neural network operators having parameters that are supported by the acceleration engine for execution on the acceleration engine.

3. The method of claim 1, further comprising compiling the fourth set of neural network operators for execution on the host processor.

4. A method, comprising:

executing a machine learning framework to generate operators of a neural network, wherein at least some of the neural network operators are executable on an acceleration engine;

identifying neural network operators from the neural network that are supported by a compiler for an acceleration engine;

partitioning, by a partitioner, the neural network operators that are supported by the compiler into a set of first operators that is initially determined to be executable by the acceleration engine and a set of second operators that is executable by a host processor;

evaluating parameters of the first set of operators;

determining that specific instances of neural network operators of the first set of operators include a parameter that is not supported by the acceleration engine;

partitioning, by the partitioner, the operator that includes the parameter that is not supported by the acceleration engine for execution on the host processor;

compiling a first model of a first subset of the operators supported by the compiler for execution on the acceleration engine; and compiling a second model of a second subset of the operators supported by the compiler for execution on the host processor, the second subset of the operators including the specific instances of neural network operators having the parameters that are not supported by the acceleration engine.

5. The method of claim 4, wherein the identifying comprises:

receiving a list of neural network operators that are supported by the compiler; and comparing the neural network operators from the neural network to the list.

6. The method of claim 5, further comprising partitioning the neural network operators that are not on the list of neural network operators that are supported by the compiler for execution on the machine learning framework.

7. The method of claim 4, wherein the partitioning comprises:

determining that an operator of the first set of operators is supported by the acceleration engine;

determining that the operator can execute faster on the host processor than on the acceleration engine; and partitioning the operator for execution on the host processor.

8. The method of claim 4, wherein the partitioning comprises:

evaluating a sequence of operators of the set of first operators;

determining that the sequence of operators is not supported by the acceleration engine; and partitioning the sequence of operators for execution on the host processor.

9. The method of claim 4, further comprising:

determining that compiling the set of first operators failed; and repartitioning the first set of operators for execution on the machine learning framework.

10. A system, comprising:

a set of processors; and an acceleration engine, wherein the set of processors is configured to:

execute a machine learning framework to generate neural network operators, wherein at least some of the operators are executable on the acceleration engine;

partition, by a partitioner, the neural network operators into a first subset of operators that are initially determined to be supported by a compiler for the acceleration engine and a set of second operators that is executable by the set of processors;

evaluate parameters of the first subset of operators;

determine that a parameter of an operator of the first subset of operators initially determined to be supported by a compiler for the acceleration engine is not supported by the acceleration engine; and partition, by the partitioner, the operator of the first subset of operators initially determined to be capable of execution supported by the compiler for the acceleration engine for execution on the set of processors;

compile a first model of the first subset of the operators supported by the compiler for execution on the acceleration engine; and compile a second model of a second subset of the operators supported by the compiler for execution on the set of processors, the second subset of the operators including specific instances of neural network operators having the parameters that are not supported by the acceleration engine.

11. The system of claim 10, further comprising a partitioner configured to:

determine which of the operators are not supported by the compiler; and partition for execution on the machine learning framework the operators not supported by the compiler.

12. The system of claim 11, wherein the partitioner is further configured to:

receive, from the compiler, a list of operators supported by the compiler, compare the operators of the neural network to the list, and based on the comparison, partition the neural network operators supported by the compiler and operators not supported by the compiler.

13. The system of claim 10, wherein the set of processors is further configured to:

evaluate parameters of an operator; and partition the operator for execution on the set of processors when a parameter that is not supported by the acceleration engine is detected.

14. The system of claim 10, wherein the set of processors is further configured to:
  evaluate a sequence of operators of the first subset of operators;
  determine that the sequence of operators is not supported by the acceleration engine; and
  partition the sequence of operators for execution on the set of processors.

15. The system of claim 10, wherein the acceleration engine is configured to execute the first compiled model.

16. The system of claim 10, wherein the set of processors is configured to execute the second compiled model.

17. A non-transitory computer readable medium having stored therein instructions for making one or more processors execute a method for partitioning operators of a neural network, the processor executable instructions comprising instructions for performing operations including:
  executing a machine learning framework to generate operators of a neural network, wherein at least some of the neural network operators are executable on an acceleration engine;
  identifying neural network operators from the neural network that are supported by a compiler for an acceleration engine;
  partitioning, by a partitioner, the neural network operators that are supported by the compiler into a set of first operators that is initially determined to be executable by the acceleration engine and a set of second operators that is executable by a host processor;
  evaluating parameters of the first set of operators;
  determining that specific instances of neural network operators of the first set of operators include a parameter that is not supported by the acceleration engine;
  partitioning, by the partitioner, the operator for execution on the host processor;
  compiling a first model of a first subset of the operators supported by the compiler for execution on the acceleration engine; and
  compiling a second model of a second subset of the operators supported by the compiler for execution on the host processor, the second subset of the operators including the specific instances of neural network operators having the parameters that are not supported by the acceleration engine.

\* \* \* \* \*